(12) United States Patent
Deng et al.

(10) Patent No.: US 8,576,871 B2
(45) Date of Patent: *Nov. 5, 2013

(54) COLLISION AVOIDANCE METHODS AND APPARATUS FOR INTERCOMMUNICATION SYSTEMS

(75) Inventors: Hongchao Deng, Beijing (CN); Jingdong Lin, Irvine, CA (US)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 1703 days.

This patent is subject to a terminal disclaimer.

(21) Appl. No.: 11/971,180

(22) Filed: Jan. 8, 2008

(65) Prior Publication Data

US 2008/0175365 A1    Jul. 24, 2008

(30) Foreign Application Priority Data

Jan. 8, 2007    (CN) .......................... 2007 1 0036246

(51) Int. Cl.
| | |
|---|---|
| H04B 7/212 | (2006.01) |
| H04L 12/16 | (2006.01) |
| H04J 3/16 | (2006.01) |
| H04J 4/00 | (2006.01) |
| H04W 68/00 | (2009.01) |

(52) U.S. Cl.
USPC ........... 370/444; 370/231; 370/263; 370/280; 370/436; 370/437; 370/478; 455/458; 455/515; 455/516; 455/519

(58) Field of Classification Search
USPC ......... 370/260–263, 280, 230–231, 352–356, 370/390, 431–437, 442, 445–448, 458–461, 370/464, 478, 480, 485, 444; 455/458, 455/515–519
See application file for complete search history.

(56) References Cited

U.S. PATENT DOCUMENTS

| 3,480,733 | A | * | 11/1969 | Miyagi et al. ................. 370/492 |
|---|---|---|---|---|
| 5,657,323 | A | * | 8/1997 | Jan et al. ........................ 370/252 |
| 6,023,626 | A | * | 2/2000 | Kinnunen et al. ............. 455/512 |
| 6,526,027 | B1 | * | 2/2003 | Yeom ............................. 370/312 |
| 6,963,544 | B1 | * | 11/2005 | Balachandran et al. ....... 370/281 |
| 8,009,603 | B2 | * | 8/2011 | Lu et al. ......................... 370/312 |
| 8,073,478 | B2 | * | 12/2011 | Hongchao ..................... 455/518 |
| 2001/0040883 | A1 | * | 11/2001 | Chang et al. .................. 370/344 |
| 2003/0157945 | A1 | * | 8/2003 | Chen et al. .................... 455/458 |
| 2004/0127233 | A1 | * | 7/2004 | Harris et al. .................. 455/458 |
| 2005/0152350 | A1 | * | 7/2005 | Sung et al. ..................... 370/376 |
| 2006/0030344 | A1 | * | 2/2006 | Lim ............................... 455/512 |
| 2006/0126635 | A1 | * | 6/2006 | Alberth et al. ............. 370/395.2 |
| 2006/0205426 | A1 | * | 9/2006 | Denton .......................... 455/518 |
| 2007/0058573 | A1 | * | 3/2007 | Schwagmann et al. ....... 370/260 |

* cited by examiner

*Primary Examiner* — Luat Phung
*Assistant Examiner* — Kai Chang

(57) ABSTRACT

A collision avoidance method for subscribers to fight for a right to speak of a multi-party conversation in a digital intercommunication system includes: sending a frame of instructions from the transmitting subscriber to the receiving subscribers for declaring a beginning of a fight for phase; in a subset of frame moments during the fight-for phase, sending maintenance information by the transmitting subscriber to the receiving subscribers; in another subset of the frame moments during the fight-for phase, broadcasting a request for the right to speak by the receiving subscribers intending to obtain the right to speak in turn, the fight-for phase not closing until at least one of the receiving subscribers sends out a request message; hearing the request message, ceasing fighting for the right to speak by the other receiving subscribers; and the receiving subscriber obtaining the right to speak as a new transmitting subscriber and beginning to speak.

20 Claims, 4 Drawing Sheets

COLLISION AVOIDANCE METHODS AND APPARATUS FOR INTERCOMMUNICATION SYSTEMS

CROSS-REFERENCE TO RELATED APPLICATION(S)

This application claims priority to Chinese Patent Application No. 200710036246.4, filed on Jan. 8, 2007, the disclosure of which is incorporated herein by reference in its entirety.

TECHNICAL FIELD

The present disclosure is related to multiple access schemes used in a multi-party conversation. In particular, the present disclosure is related to methods for controlling hand over of a right to speak in a multi-party conversation via digital intercommunication systems.

BACKGROUND

Digital intercommunication systems typically work in half-duplex mode and do not include a central control station when all subscribers are fully connected. When carrying out a multi-party conversation in half-duplex mode, at one time, no more than one transmitting subscriber has a right to speak and occupies the physical channel to transmit voice signals.

In order to ensure that every subscriber has a chance to obtain the right to speak, a configuration is needed for handing over the right to speak among the multiple subscribers. Conventional intercommunication systems typically include some established polling rules for handing over the right to speak, or leave to each subscriber to fight freely for the right to speak. Such arrangements can be inefficient or may bring collision. When polling rules are used, a subscriber who wants to speak may have to wait for a long period of time before it is polled and given the right to speak. As a result, the communication efficiency may suffer. When subscribers are allowed to fight freely for the right to speak, collisions in the physical channel would likely occur if multiple subscribers want to speak at the same time. The back-off associated with such collisions can cause significant delay, and thus wasting precious physical channel resources. Accordingly, there is a need for improving the efficiency of handing over the right to speak among multiple subscribers in a multi-party conversation in intercommunication systems.

DETAILED DESCRIPTION

The following disclosure describes several embodiments of methods and systems for controlling handing over the right to speak using collision avoidance techniques in an intercommunication system. Several details describing well-known structures or processes often associated with digital intercommunication systems are not set forth in the following description for purposes of brevity and clarity. Also, several other embodiments of the invention can have different configurations, components, or procedures than those described in this section. A person with ordinary skill in the art, therefore, will accordingly understand that the invention may have other embodiments without several of the elements shown and described below with reference to FIGS. 1-4.

Figure 1:
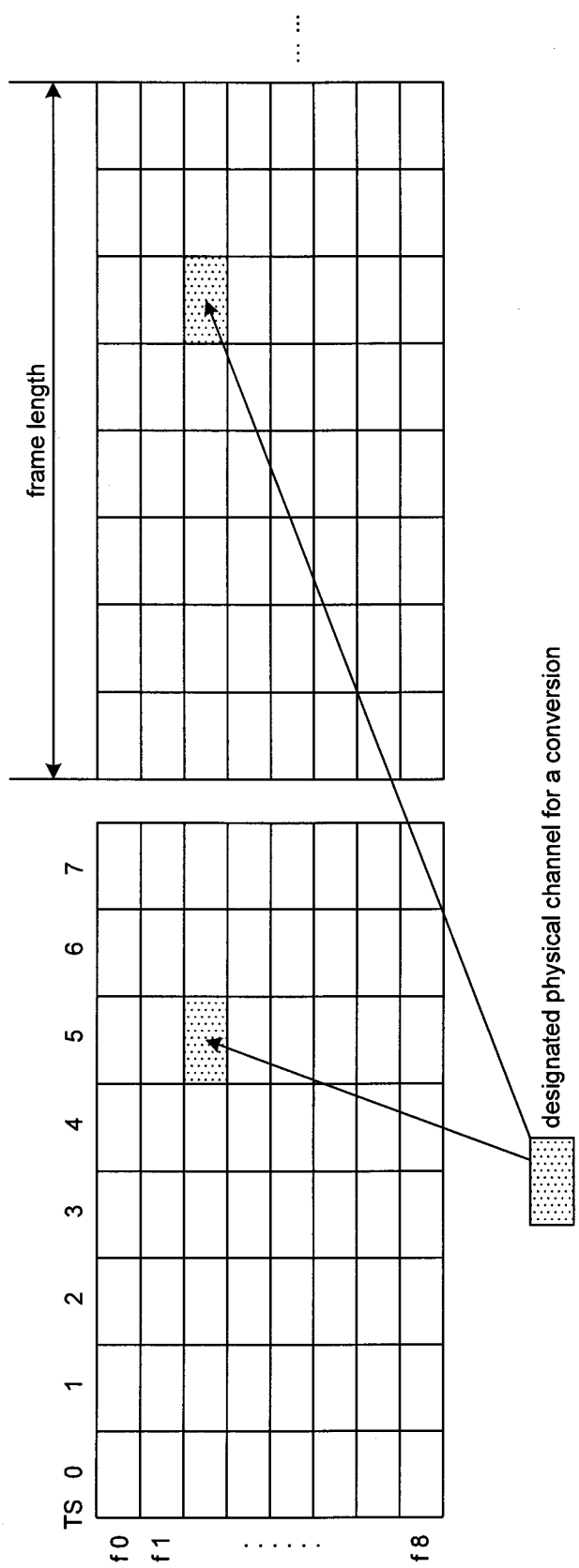
FIG. 1 is a schematic diagram illustrating a radio frequency band (e.g., from 915.0125 to 916.9875 MHz) divided into a plurality of physical channels in an intercommunication system in accordance with an embodiment of the invention.

FIG. 1 is a schematic diagram illustrating a radio frequency band (e.g., from 915.0125 to 916.9875 MHz) divided into a plurality of physical channels in an intercommunication system in accordance with an embodiment of the invention. In certain embodiments, a digital intercommunication system is assigned to use the radio frequency band from 915.0125 to 916.9875 MHz. The digital intercommunication system can include a plurality of subscribers (e.g., cellular phones, walk-talkies, and/or other intercommunicating devices) connected in a network (e.g., a cellular phone network). The intercommunication system is fully connected, i.e., all subscribers in a multi-party conversation can connect to one other with a single hop. In one embodiment, the intercommunication system is configured as an interphone system. In other embodiments, the intercommunication system can be configured as an intercom and/or other communication systems.

As shown in FIG. 1, in certain embodiments, the frequency resource can be divided to equally allocate the assigned radio frequency band to 9 carriers (with frequency numbers from 0 to 8) with a 200 KHz frequency interval. Every carrier frequency can be further divided into 8 time slots (with slot numbers from 0 to 7) with a frame length of 4.615 ms. The length of one time slot is 0.577 ms. Based on the foregoing scheme of frequency and time division, a combination of a carrier number and a time slot number can be used to represent a physical channel. For example, the physical channel (2,5) represents time slot number 5 on carrier number 2. The center frequencies for all the carriers can be calculated as $915+0.2 \times (n+1)$ MHz, where n is an integer from 0 to 8. For example, the frequency band of carrier 4 is 915.9-916.1 MHz, and its center frequency is 916 MHz. Therefore, subscribers in the intercommunication system can access the system via time division multiple access (TDMA) and frequency division multiple access (FDMA) methods.

In certain embodiments, the nine frequency bands in the digital intercommunication system can be designated as one control frequency band (e.g., No. 8) and eight traffic frequency bands (e.g., Nos. 0-7). The control frequency band can be used to transmit control information such as paging requests, paging acknowledgements, traffic types, etc. The traffic frequency bands can be used to transmit user communication data including, e.g., speech, data, instructions, etc.

Throughout the description, the following terms generally have the following meanings: (1) a right to speak: If a subscriber can use a Forward Traffic Channel (FTCH, a logical channel used to carry traffic data) to transmit speech information to others via a designated physical channel, then the subscriber has the right to speak. (2) a transmitting subscriber: a subscriber who has the right to speak during a talk phase and is the transmitting party of the half-duplex communication. (3) a receiving subscriber: a subscriber who can only listen but does not have permission to speak during the talk phase. The receiving subscriber is the receiving party of the half-duplex communication. In the fight-for phase, all receiving subscribers can fight for to send a request message to the current transmitting subscriber for the right to speak.

Figure 4:
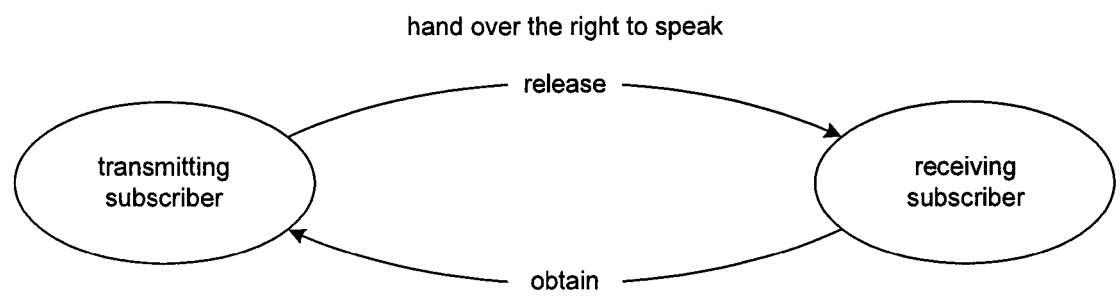
FIG. 4 is a schematic diagram illustrating handing over a right to speak between two subscribers of a multi-party conversation in accordance with an embodiment of the invention.

(4) a round: a period of time during which the right to speak is assigned to a transmitting subscriber and not handed over to others. For example, subscriber A, B, and C are in a multi-party conversation, the period that subscriber A is the transmitting subscriber is a round. If subscriber A hands over the right to speak to subscriber B, the period that subscriber B is the transmitting subscriber is another round. In certain embodiments, there is only one transmitting subscriber and the others are all receiving subscribers in a round. (5) to hand over the right to speak: when a transmitting subscriber hands over the right to speak to a receiving subscriber, the transmitting subscriber becomes a receiving subscriber of the next round. The receiving subscriber to which the right to speak is handed becomes the transmitting subscriber of the next round. As illustrated in FIG. 4, the current transmitting subscriber releases the right to speak after handing over and becomes a receiving subscriber. The receiving subscriber that obtains the right to speak becomes the transmitting subscriber of the multi-party conversation.

Figure 2:
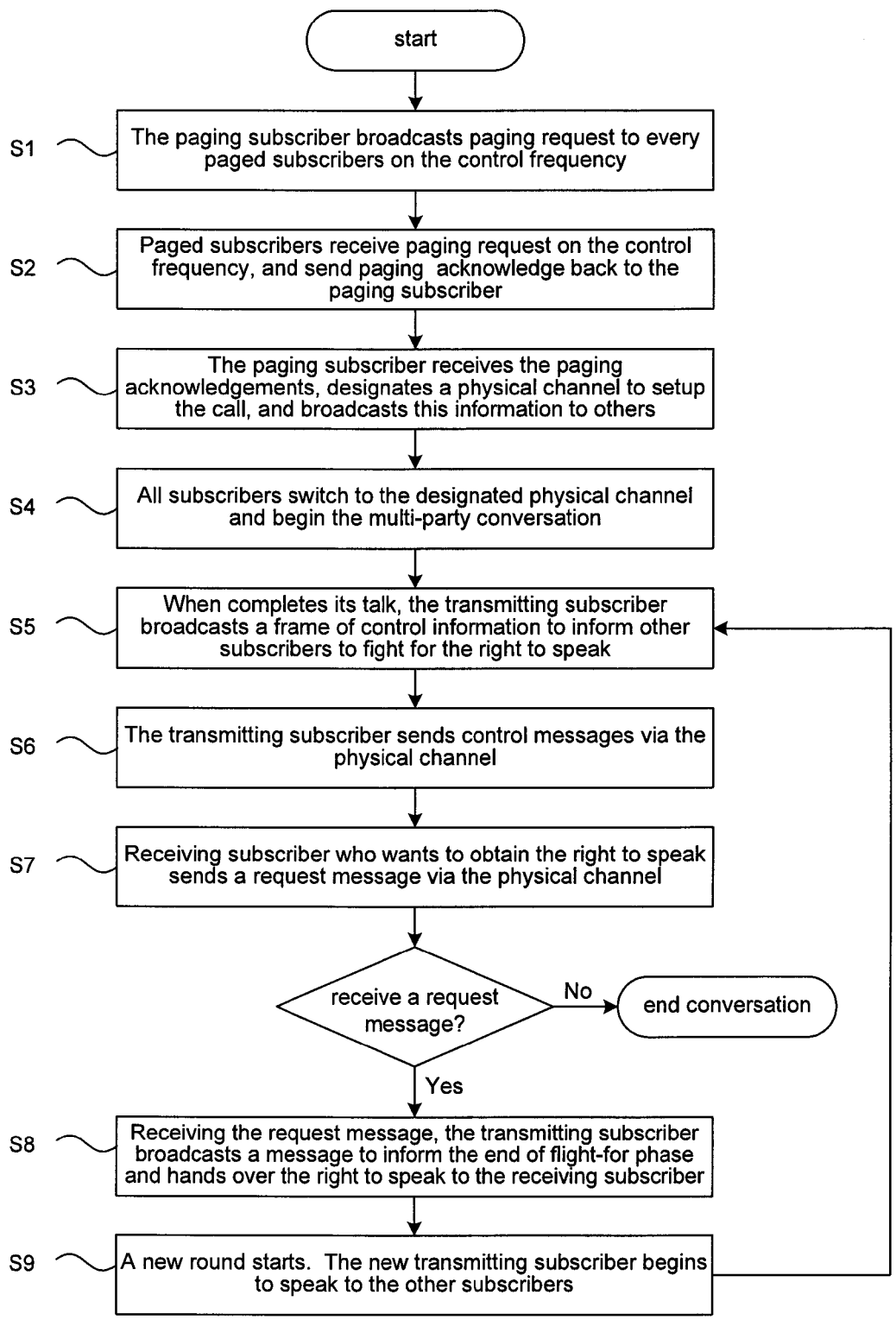
FIG. 2 is a flowchart illustrating a collision avoidance method for handing over a right to speak in an intercommunication system in accordance with an embodiment of the invention.

FIG. 2 is a flowchart illustrating a collision avoidance method for handing over a right to speak in an intercommunication system in accordance with an embodiment of the invention. Various operations of the collision avoidance method are described below.

Operation S1: The paging subscriber broadcasts a paging request to other subscribers on the control frequency. The paging request can include identification numbers of all subscribers in this multi-party conversation. Synchronization, traffic type and/or other control information used to set up the call can also be included in the paging request.

Operation S2: Each paged subscriber monitors the control frequency for corresponding paging request. When the paged subscribers receive a corresponding paging request, the paged subscribers transmit paging acknowledgements back to the paging subscriber, e.g., sequentially. The paging acknowledgements can include a measurement report of traffic frequency bands, receiving signal quality, and/or other control information.

Operation S3: After receiving the paging acknowledgement from each paged subscriber, the paging subscriber identifies all the subscribers who intend to participate in the multi-party conversation, designates a time slot in a traffic frequency band to set up the conversation base on the measurement reports of the traffic frequency bands supplied by the paged subscribers, and broadcasts the designation to the participating subscribers.

Operation S4: After the call setup process described in Operation S1-S3, all participating subscribers switch to the physical channel designated during Operation S3 and begin the multi-party conversation. The paging subscriber speaks as the transmitting subscriber first, and all the paged subscribers are receiving subscribers. The paging subscriber occupies the designated physical channel to transmit a plurality of frames to the receiving subscribers. The multi-party conversation can include voice, data, text messages, facsimile, and/or other types of services.

Operation S5: After completing transmission via the designated physical channel, the transmitting subscriber broadcasts a frame of control instructions to inform the other subscribers to begin fighting for the right to speak. All receiving subscribers can participate in fighting for the right to speak, and in some embodiments, the transmitting subscriber can also fight for another round of right to speak with the receiving subscribers. The multi-party conversation goes into a fight-for phase.

Operation S6: After the fight-for phase starts, in one subset of the TDMA frames, the transmitting subscriber broadcasts physical channel maintenance information to others via the physical channel.

Operation S7: After the fight-for phase starts, in another subset of the TDMA frames, receiving subscribers who want to obtain the right to speak can fight for the right to speak by broadcasting a request for the right to speak via, e.g., pressing a button on the device.

Figure 3:
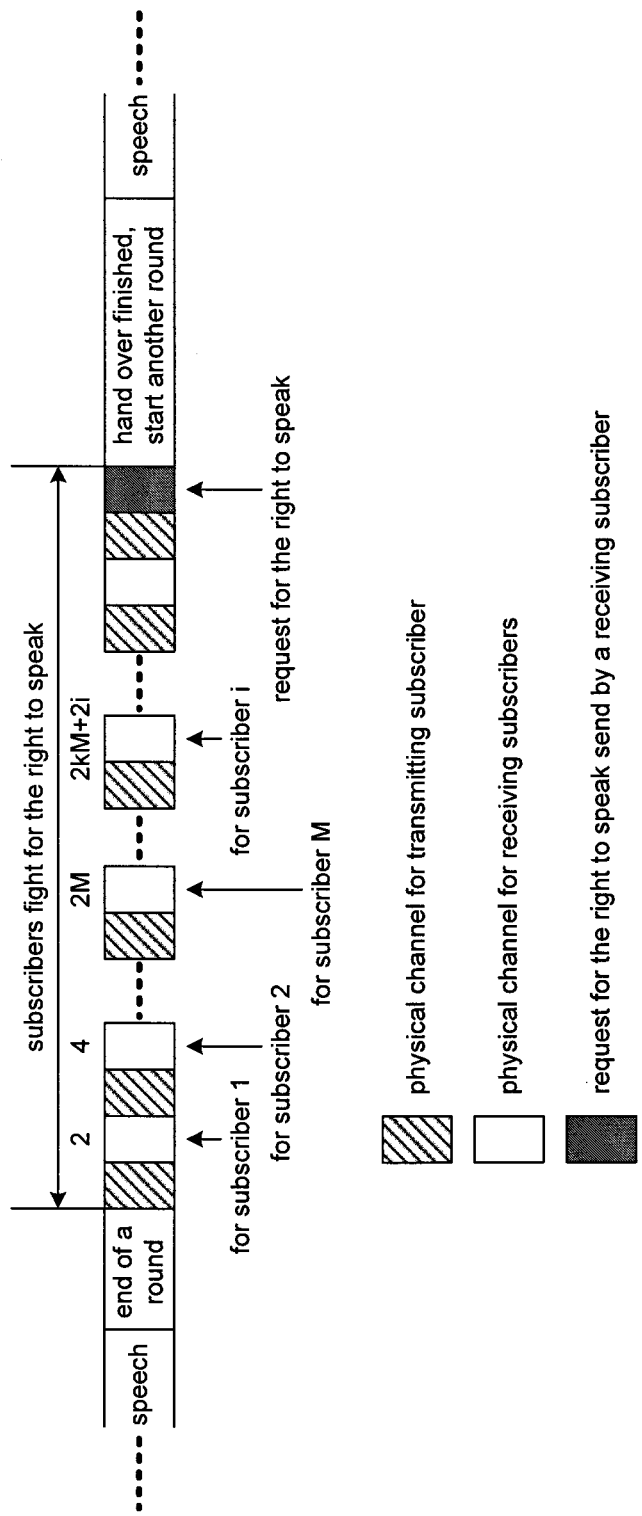
FIG. 3 is a schematic diagram illustrating a collision avoidance method of handing over a right to speak in an intercommunication system using TDMA method in accordance with an embodiment of the invention.

FIG. 3 is a schematic diagram illustrating the collision avoidance method of handing over a right to speak using TDMA in accordance with an embodiment of the invention. As shown in FIG. 3, receiving subscribers take turns to send a request message via the physical channel during the fight-for phase. In FIG. 3, the collision avoidance method is illustrated using the odd and even number of TDMA frames. However, in other embodiments, the first and second subsets of the TDMA frames can be based on some other time division relationship. In other words, the particular TDMA frames used for the channel maintenance information in Operation S6 and the request for the right to speak from the receiving subscribers in Operation S7 are not limited to odd number of frames or even number of frames, but can have other arrangements.

In the illustrated embodiment, assuming that there are M+1 subscribers in a multi-party conversation, i.e., one transmitting subscriber and M receiving subscribers numbered i=1, 2, 3, . . . , M, during the fight-for phase, when receiving subscriber i presses a button, the request for the right to speak message of receiving subscriber i is sent at the frame moment of $2kM+2i$ ($k=0, 1, 2, \ldots$, $i=1, 2, \ldots M$). Each receiving subscriber can have a chance to send a request message in a fight-for period of 2M frames (length of the time period is 2M×4.615 ms) by pressing its button. The fight-for process is repeated until a receiving subscriber sends out its request message. After a receiving subscriber successfully broadcasts a request message for the right to speak, the other subscribers immediately stop fighting for the right to speak once these subscribers detect the request message broadcast by the receiving subscriber via the physical channel.

If at least one receiving subscriber broadcasts a request message during the fight-for phase, the process proceeds to Operation S8. If no receiving subscriber broadcasts a request message for the right to speak and the fight-for phase expires, the transmitting subscriber stops sending channel maintenance information, releases the physical channel, and the multi-party conversation ends.

Operation S8: After receiving the request message, the transmitting subscriber broadcasts a message to indicate the end of the fight-for phase and hands over the right to speak to the receiving subscriber. Detecting the request message on the physical channel, the other receiving subscribers stop fighting for the right to speak, and their request messages would not be sent even if their button is pressed. As illustrated in FIG. 2, the transmitting subscriber then releases the right to speak and becomes a receiving subscriber of the coming round. Meanwhile, the receiving subscriber who broadcasts the request message obtains the right to speak and becomes a transmitting subscriber of the coming round and occupies the physical channel for transmission.

Operation S9: A new round starts. The transmitting subscriber begins to speak and the other subscribers listen. After the transmitting subscriber finishes its transmission, the process reverts to Operation S5.

An example is described below to demonstrate the collision avoidance method described above according to several embodiments of the present invention. In this example, subscriber A pages subscriber B, C, and D to set up a multi-party conversation. All subscribers in the group can communicate to one another by a single hop. Subscriber A first broadcasts a paging request to subscribers B, C, and D on the control frequency. Synchronization, identifications of the subscribers, and/or other control information can also be included in the paging request.

After receiving the paging request, subscribers B, C, and D individually send paging acknowledgement one by one to paging subscriber A on the control frequency. The paging acknowledgement can include, e.g., traffic frequency band measurements, receiving signal strength, and/or other communication information.

Paging subscriber A receives the paging acknowledgements and identifies that paged subscribers B, C, and D are participants in the multi-party conversation. Subscriber A then selects a time slot in a traffic frequency band as the designated physical channel for the multi-party conversation based on received measurements of traffic frequency bands contained in the paging acknowledgements. After the call setup, all subscribers switch to the designated physical channel and begin the multi-party conversation.

The paging subscriber A obtains the right to speak first and becomes the transmitting subscriber for the first round. Paged subscribers B, C, and D are receiving subscribers for the first round. Subscriber A broadcasts speech information via the physical channel to subscribers B, C, and D.

When subscriber A has finished transmitting, subscriber A broadcasts a frame of control instructions to inform the other subscribers to fight for the right to speak. The multi-party conversation goes into the fight-for phase. Each receiving subscriber is permitted to fight for the right to speak by pressing certain buttons on a subscriber device (e.g., a keyboard) during the fight-for period.

In a particular embodiment, in odd frame moments (frame numbers: 1, 3, 5, 7, . . . etc.) during the fight-for phase, the physical channel is used by transmitting subscriber A to send certain control messages, such as the physical channel maintenance information and/or other information. In even frame moments (frame numbers: 2, 4, 6, 8, . . . etc.) during the fight-for phase, the physical channel is used by receiving subscribers B, C, and D to send request message for the right to speak. For example, the physical channel is used by subscriber B in frame moments 6 k+2(k=0, 1, 2, 3, . . . ), by subscriber C in frame moments 6 k+4, and by subscriber D in frame moments of 6k+6. In this example, each set of 6 frame moments (4.615 ms×6=27.69 ms) makes up of a fight-for period. Individual receiving subscribers have a chance to send a request message in each fight-for period of 27.69 ms by pressing its button.

Assuming that subscriber D presses its button in the moment of 1 second into the fight-for phase for the right to speak, while subscriber B presses its button in the moment of 1.5 seconds, and subscriber C doesn't desire to get the right to speak so it doesn't press button. Because subscriber D pressed its button earlier than the others, the request message of subscriber D is sent out at the frame moments of 6 k+6=6× 36+6=222 (here 'k' is 36 since subscriber D presses its button in the moment of 1 second into the fight-for phase), and the time range of the frame moment is from 1020 to 1024.615 millisecond.

Hearing subscriber D has sent out the request message for the right to speak, subscriber B and C will no longer be able to send a request message for the right to speak. For example, even though subscriber C presses the button in the moment of 1.5 seconds, the request message of subscriber C would not be sent out.

Having received the request message of subscriber D, subscriber A releases the right to speak, hands the right to speak over to subscriber D, and broadcasts a message to the other subscribers indicating the end of fight-for phase.

Another round of the multi-party conversation starts. Having obtained the right to speak, subscriber D becomes the transmitting subscriber of this round and begins to speak to others. Subscriber A, B, and C are the receiving subscribers of this round.

One feature of the method described above includes distributing different frame moments during the fight-for phase to different receiving subscribers to send their request messages for the right to speak of multi-party conversation in intercommunication systems. Thus, request messages of different subscribers cannot be sent out at the same time even if they press button simultaneously. Thus, the risk of collision of request bursts on the physical channel can be at least reduced, if not avoided, to enable each receiving subscriber to obtain the right to speak efficiently. If a receiving subscriber presses the button earlier than the other subscribers for the right to speak, the receiving subscriber most likely would obtain the right to speak.

From the foregoing, it will be appreciated that specific embodiments of the invention have been described herein for purposes of illustration, but that various modifications may be made without deviating from the invention. Many of the elements of one embodiment may be combined with other embodiments in addition or in lieu of the elements of the other embodiments. Accordingly, the invention is not limited except as by the appended claims.

We claim:

1. A collision avoidance method for subscribers to fight for a right to speak of a multi-party conversation in a digital intercommunication system, comprising the steps of:
   (1) broadcasting a paging request from a paging subscriber to one of paged subscribers on a control frequency band, wherein the paging request comprises an identification number of one of the paged subscribers, synchronization information, and traffic types;
   (2) when one of the paged subscribers receives a corresponding paging request on the control frequency band, sending a paging acknowledgement from one of the paged subscribers to the paging subscriber in turn on the control frequency band, wherein the paging acknowledgement comprises a measurement report of a traffic frequency band and a receiving signal quality;
   (3) designating a physical channel of the traffic frequency band for the multi-party conversation, and then starting the multi-party conversation by the paging and paged subscribers on the designated physical channel of the traffic frequency band, wherein the designation comprises the paging subscriber determining all paged subscribers participating in the multi-party conversation after receiving the paging acknowledgement of one of the paged subscribers, and then selecting a time slot in the traffic frequency band as the physical channel for the multi-party conversation based on the measurement report of the traffic frequency band of one of the paged subscribers, and then broadcasting the selection to the paged subscribers, and wherein starting the multi-party conversation comprises the paging subscriber firstly speaking as a transmitting subscriber, and then broadcasting an encoded voice information frame, and then the paged subscribers receiving the encoded voice information frame as receiving subscribers;

(4) after finishing the speak on the physical channel, sending a frame of instructions from the transmitting subscriber to the receiving subscribers for declaring a beginning of a fight-for phase;

(5) in a first subset of frame moments during the fight-for phase, broadcasting maintenance information by the transmitting subscriber via the physical channel to the receiving subscribers;

(6) in a second subset of the frame moments during the fight-for phase, broadcasting a fight request message for the right to speak by the receiving subscribers intending to obtain the right to speak via pressing a button on a corresponding device in turn, wherein the fight-for phase is not closed until at least one of the receiving subscribers sends out the fight request message, and wherein the first and second subsets of the frame moments are based on a same odd and even time-division multiplexing relationship;

(7) ceasing fighting for the right to speak by the other receiving subscribers after hearing the fight request message on the physical channel;

(8) starting a speak by one of the receiving subscribers, as a new transmitting subscriber, which has obtained the right to speak via the physical channel, wherein the original transmitting subscriber becomes a new receiving subscriber; and (9) repeating the steps (4) to (8) for completing a subsequent switch of the right to speak.

2. The collision avoidance method, as recited in claim 1, wherein the transmitting subscriber can fight for the right to speak together with the receiving subscribers.

3. The collision avoidance method, as recited in claim 1, wherein the step (7) further comprises sending a frame of instructions from the transmitting subscriber to the receiving subscribers for informing an end of the fight-for phase after receiving the fight request information.

4. The collision avoidance method, as recited in claim 2, wherein the step (7) further comprises sending a frame of instructions from the transmitting subscriber to the receiving subscribers for informing an end of the fight-for phase after receiving the fight request information.

5. The collision avoidance method, as recited in claim 1, wherein the traffic types comprise speech, data, text message, and facsimile.

6. The collision avoidance method, as recited in claim 2, wherein the traffic types comprise speech, data, text message, and facsimile.

7. The collision avoidance method, as recited in claim 3, wherein the traffic types comprise speech, data, text message, and facsimile.

8. The collision avoidance method, as recited in claim 4, wherein the traffic types comprise speech, data, text message, and facsimile.

9. The collision avoidance method, as recited in claim 1, wherein the control frequency band is configured to transport the paging request and the paging acknowledgement, and wherein the traffic frequency bands are configured to transport encoded user speech or data.

10. The collision avoidance method, as recited in claim 2, wherein the control frequency band is configured to transport the paging request and the paging acknowledgement, and wherein the traffic frequency bands are configured to transport encoded user speech or data.

11. The collision avoidance method, as recited in claim 3, wherein the control frequency band is configured to transport the paging request and the paging acknowledgement, and wherein the traffic frequency bands are configured to transport encoded user speech or data.

12. The collision avoidance method, as recited in claim 4, wherein the control frequency band is configured to transport the paging request and the paging acknowledgement, and wherein the traffic frequency bands are configured to transport encoded user speech or data.

13. The collision avoidance method, as recited in claim 5, wherein the control frequency band is configured to transport the paging request and the paging acknowledgement, and wherein the traffic frequency bands are configured to transport encoded user speech or data.

14. The collision avoidance method, as recited in claim 6, wherein the control frequency band is configured to transport the paging request and the paging acknowledgement, and wherein the traffic frequency bands are configured to transport encoded user speech or data.

15. The collision avoidance method, as recited in claim 7, wherein the control frequency band is configured to transport the paging request and the paging acknowledgement, and wherein the traffic frequency bands are configured to transport encoded user speech or data.

16. The collision avoidance method, as recited in claim 8, wherein the control frequency band is configured to transport the paging request and the paging acknowledgement, and wherein the traffic frequency bands are configured to transport encoded user speech or data.

17. The collision avoidance method, as recited in claim 13, wherein the multi-party conversation comprises a frequency resource allocation scheme in which a frequency band from 915.0125MHz to 916.9875MHz is equally assigned to nine carriers with a 200KHz frequency interval, and a frame with a length of 4.615ms is equally divided into 8 time slots.

18. The collision avoidance method, as recited in claim 14, wherein the multi-party conversation comprises a frequency resource allocation scheme in which a frequency band from 915.0125MHz to 916.9875MHz is equally assigned to nine carriers with a 200KHz frequency interval, and a frame with a length of 4.615ms is equally divided into 8 time slots.

19. The collision avoidance method, as recited in claim 15, wherein the multi-party conversation comprises a frequency resource allocation scheme in which a frequency band from 915.0125MHz to 916.9875MHz is equally assigned to nine carriers with a 200KHz frequency interval, and a frame with a length of 4.615ms is equally divided into 8 time slots.

20. The collision avoidance method, as recited in claim 16, wherein the multi-party conversation comprises a frequency resource allocation scheme in which a frequency band from 915.0125MHz to 916.9875MHz is equally assigned to nine carriers with a 200KHz frequency interval, and a frame with a length of 4.615ms is equally divided into 8 time slots.

* * * * *